United States Patent [19]

Gentry et al.

[11] Patent Number: 5,020,269
[45] Date of Patent: Jun. 4, 1991

[54] FISHING BAIT ORGANIZER

[75] Inventors: William T. Gentry, Italy; Samuel M. Kogutt, Dallas, both of Tex.

[73] Assignee: Dart Manufacturing Company, Dallas, Tex.

[21] Appl. No.: 473,333

[22] Filed: Feb. 1, 1990

[51] Int. Cl.$^5$ ............... A01K 97/04; B65D 85/00
[52] U.S. Cl. ................... 43/54.1; 43/57.1; 206/315.11; 206/466; 206/472
[58] Field of Search ............... 43/54.1, 57.1; 206/315.11, 461, 466, 477, 472, 478, 526, 554; 383/81, 37

[56] References Cited

U.S. PATENT DOCUMENTS

| | | | |
|---|---|---|---|
| 2,272,623 | 2/1942 | Runner | 206/466 |
| 2,902,996 | 9/1959 | Callen | 206/449 |
| 3,029,939 | 4/1962 | Feldman | 206/466 |
| 3,327,419 | 6/1967 | Stanos | 206/478 X |
| 3,392,477 | 7/1968 | Haugen, Jr. | 43/57.1 |
| 3,395,788 | 8/1968 | Gin | 43/54.1 X |
| 3,587,843 | 6/1971 | Wing | 383/37 X |
| 4,076,122 | 2/1978 | Hall | 383/37 X |
| 4,298,158 | 11/1981 | Hoppe et al. | 206/526 X |
| 4,401,219 | 8/1983 | Mink | 206/466 X |
| 4,467,551 | 8/1984 | Pulver | 43/54.1 |
| 4,492,306 | 1/1985 | Cooper et al. | 206/472 X |
| 4,691,469 | 9/1987 | Alsobrook et al. | 43/54.1 |
| 4,703,581 | 11/1987 | Whittier | 43/57.1 |
| 4,708,243 | 11/1987 | Nailon | 206/315.11 |
| 4,825,584 | 5/1989 | Raley | 43/57.1 |
| 4,831,772 | 5/1989 | Gillespie | 43/54.1 |
| 4,852,293 | 8/1989 | Levine et al. | 43/54.1 |

FOREIGN PATENT DOCUMENTS

| | | | |
|---|---|---|---|
| 2603173 | 3/1988 | France | 206/315.11 |
| 20161 | of 1899 | United Kingdom | 43/57.1 |

Primary Examiner—Bryon P. Gehman
Attorney, Agent, or Firm—Kenneth R. Glaser

[57] ABSTRACT

A device for storing and organizing fishing baits and lures includes a flat backing member having a first attachment member and a plurality of storage bags arranged in discrete groups. Each group has a second attachment member for securing the bags of each group together and for attaching the corresponding group to the backing member. The bags define respective flaps with the respective mouths being at the free ends of the flaps. The individual bags of each group are substantially in registration and the groups are in staggered, overlapping relation so that all but the lowermost group partially overlap the groups below. A retaining member having a plurality of recessed regions is provided for receiving substantially cylindrical bait containers. A flexible casing is provided for housing and transporting the baits and lures.

17 Claims, 2 Drawing Sheets

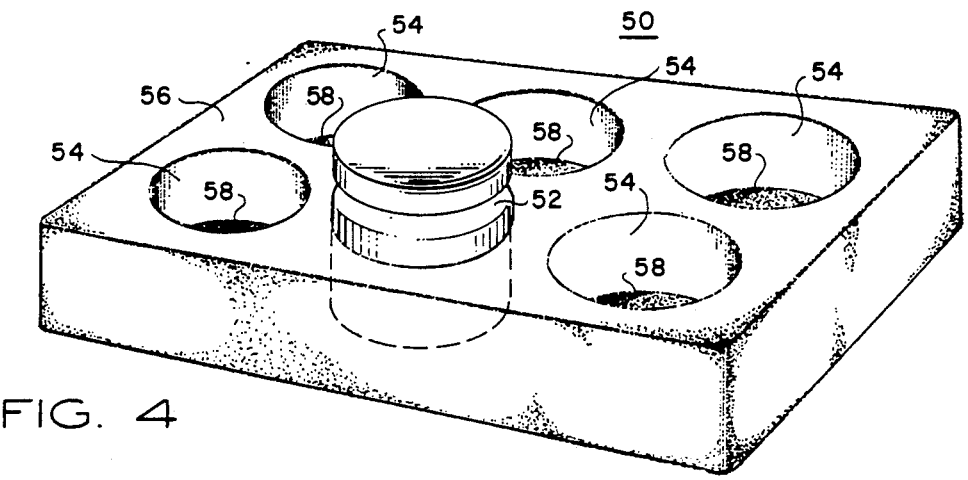
FIG. 4
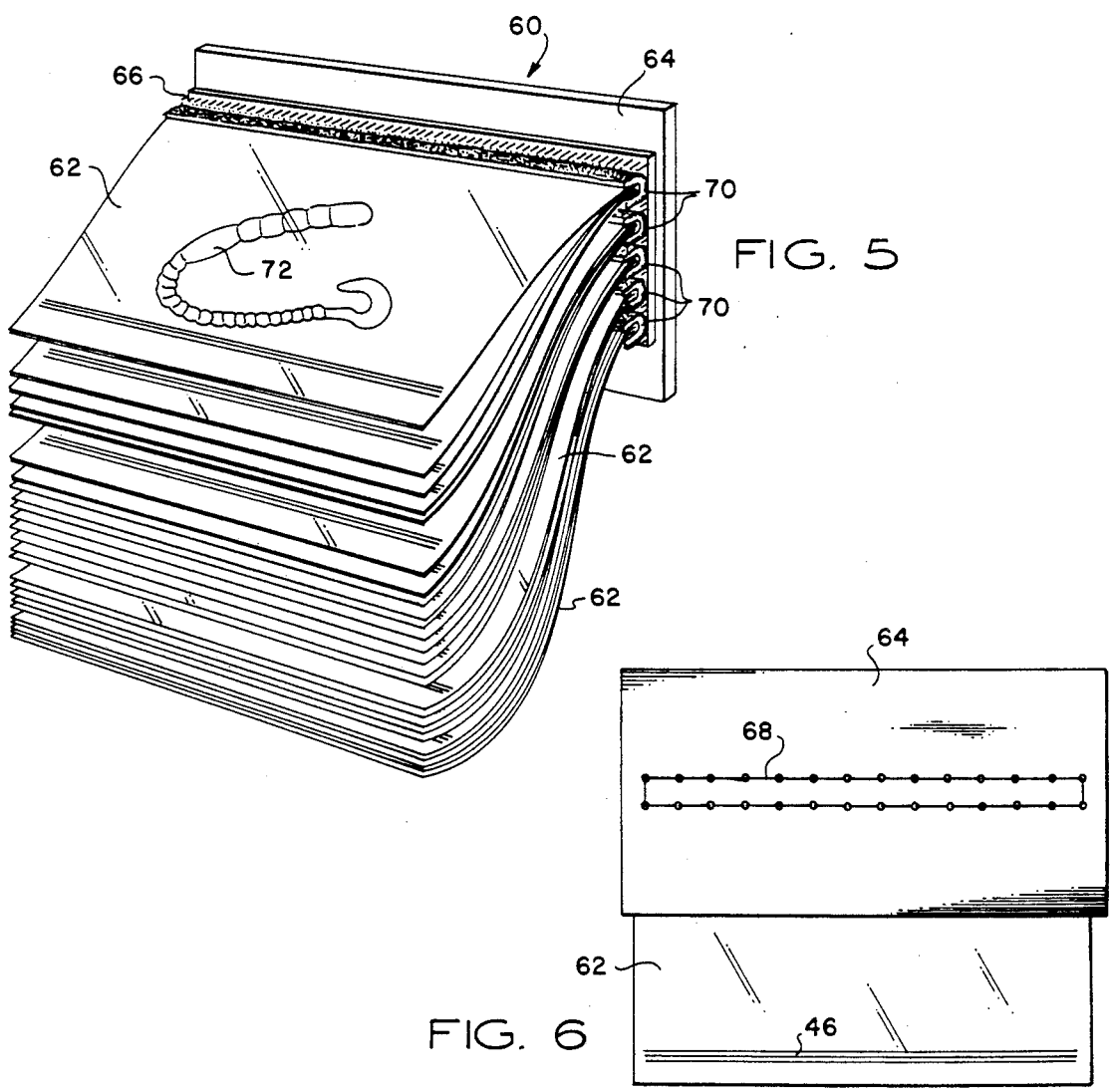
FIG. 5
FIG. 6

FISHING BAIT ORGANIZER

FIELD OF THE INVENTION

This invention relates to fishing equipment and in particular to a device for organizing fishing baits and lures

BACKGROUND OF THE INVENTION

Fishermen are known for carrying a large variety of baits and lures in order to attract fish. Different types of lures work best under different fishing conditions, and part of the thrill of fishing involves trying a variety of lures to see which one or ones work best.

DESCRIPTION OF THE PRIOR ART

According to conventional practice, fishing baits and lures are typically kept in a tackle box or the like, having a plurality of partitioned storage compartments. The tackle box typically includes hinged shelves, which are collapsible together when the tackle box is shut and which are expandable to expose the contents thereof when the box is opened.

A major disadvantage of the typical fishing tackle box is that the baits and lures frequently become intermingled and entangled, particularly if the box is turned upside down. Another problem associated with conventional tackle boxes is that the partitioned compartments are frequently not large enough to accommodate certain types of lures, such as spinner baits and plastic worms. Spinner baits typically include two spaced-apart branches, which significantly increases the overall width of the lure, such that the lure may not readily fit within a standard-sized compartment in the tackle box. Even if the compartments are large enough to accommodate the lures, it is difficult to keep the lures organized and to quickly locate a particular lure which the fisherman desires to use.

OBJECTS OF THE INVENTION

It is therefore the principal object of the present invention to provide an improved device for organizing fishing baits and lures.

Another object of the invention is to provide an improved device for storing fishing baits and lures.

Yet another object of the invention is to provide a fishing lure storage device which provides the fisherman with relatively quick and easy access to a variety of lures.

Still another object of the invention is to provide an improved device for transporting fishing baits and lures.

SUMMARY OF THE INVENTION

These and other objects are accomplished in accordance with the present invention wherein a device is provided for storing and organizing fishing lures and baits. The device includes a relatively flat backing member having a first attachment member on a surface thereof, a plurality of storage bags arranged in discrete groups, with each group having a second attachment member for securing the individual bags together and for attaching the corresponding group to the backing member. Each bag has a closable mouth at one end thereof through which fishing lures and baits can be removed from and inserted into the corresponding bag. The second attachment member attaches respective opposite ends of the bag to the backing member, such that the bags define respective flaps with the mouths of the bags at the respective free ends of the flaps.

In one embodiment, the backing member is substantially rectangular and the first attachment member extends substantially along the entire major dimension thereof. Each group of bags is attached to the first attachment member at respective discrete positions thereon, such that the individual bags of each group are substantially in registration and the groups are in staggered, overlapping relation so that all but the lowermost group partially overlap the groups below. The first attachment member is preferably comprised of hook attachment means and the second attachment members are each preferably comprised of complementary loop attachment means. A strap may be secured to the backing member for hanging the device in a vertical orientation.

In another aspect of the invention, a flexible retaining member having a plurality of recessed regions for receiving respective bait containers is provided. The top surface of the retaining member has a plurality of openings communicating with the respective recessed regions. The openings are preferably circular, such that the recessed regions are adapted for receiving substantially cylindrical containers.

In accordance with another aspect of the invention, a flexible casing is provided for storing the fishing lure organizer and the retaining member in a substantially flat position within the casing. The casing is preferably comprised of a water-repellent, flexible material and includes a pair of handle straps.

In accordance with the present invention, fishing baits and lures of various types can be stored and organized to prevent entangling of the lures and to help the fisherman find a particular lure or bait which he desires to use. The flexible casing provides a convenient means of transporting the lures and baits.

BRIEF DESCRIPTION OF THE DRAWINGS

Other objects and advantages of the invention will be apparent from the detailed description and claims when read in conjunction with the accompanying drawings, wherein.

FIG. 4 is a perspective view of an article for storing and organizing bait containers;

FIG. 5 is a perspective view of an alternate embodiment of a device for storing and organizing fishing lures; and FIG. 6 is a rear elevation view of the device of FIG. 5.

DETAILED DESCRIPTION OF THE PREFERRED EMBODIMENT

In the description which follows, like parts are marked throughout the specification and the drawings, respectively. The drawings are not necessarily to scale; and in some instances, proportions have been exaggerated in order to more clearly depict certain features of the invention.

Figure 1:
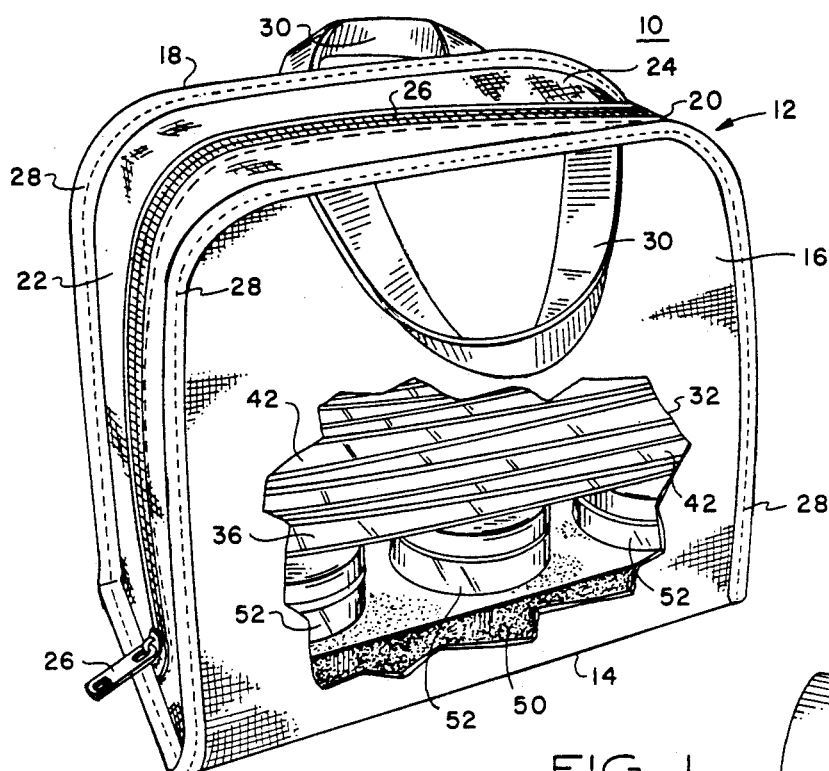
FIG. 1 is a perspective view of a casing for transporting fishing baits and lures, according to the present invention, in which a portion of the casing is broken away to show the contents thereof.

Referring to FIG. 1, a device 10 for storing and transporting fishing baits and lures includes a casing 12 having a bottom portion 14, opposed side portions 16 and 18, opposed end portions 20 and 22 and a top portion 24. Casing 12 is preferably comprised of a water-repellent, flexible material, such as a polyester weave. End portions 20 and 22 and top portion 24 are preferably integrally formed and are interconnected by means of a zipper member 26, which extends from bottom portion 14 along one end portion, across top portion 24 and then along the opposite end portion. One skilled in the art will appreciate that zipper member 26 is used to open and close casing 12. Side portions 16 and 18 and bottom portion 14 are preferably integrally formed and are attached to end portions 20 and 22 and top portion 24 by means of stitches 28.

Figure 2:
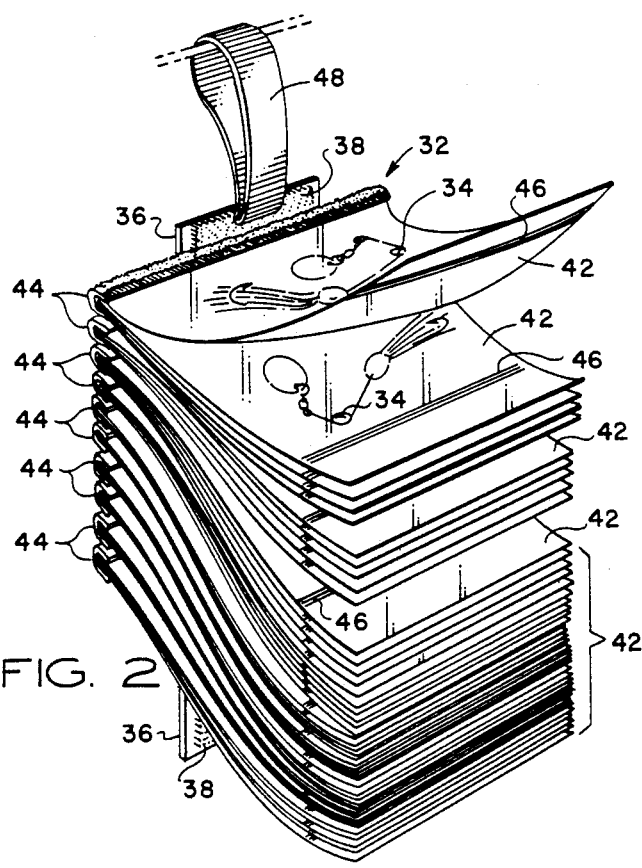
FIG. 2 is a perspective view of a device for organizing and storing fishing lures, according to the present invention.
Figure 3:
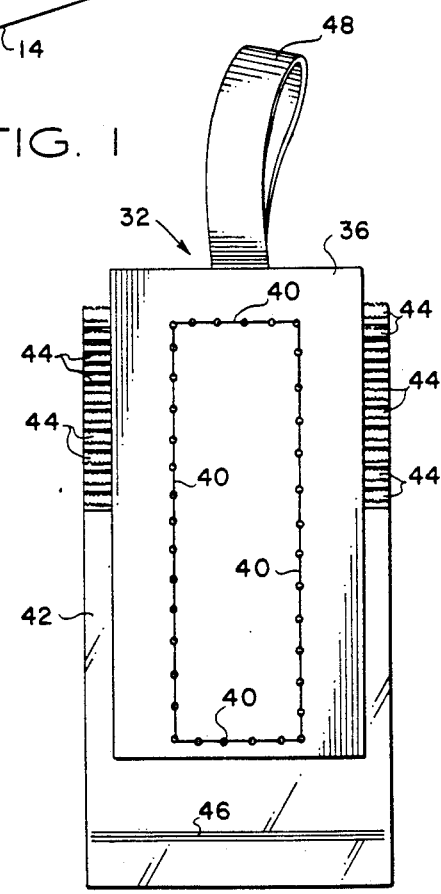
FIG. 3 is a rear elevation view of the device of FIG. 2.

Casing 12 is used to transport fishing baits and lures, as will be described in greater detail hereinafter. Casing 12 includes two flexible straps 30 to facilitate handling thereof Referring to FIGS. 2 and 3, a device 32 is provided for storing and organizing fishing lures, such as spinner baits 34. Device 32 includes a relatively flat backing member 36 having a hook fastener 38 disposed on a major surface thereof. Hook fastener 38 is preferably comprised of a plurality of hook-like elements of a flexible material, sold under the trademark "VELCRO" by Velcro Corporation of New York, N.Y. Hook fastener 38 extends along substantially the entire major dimension of backing member 36 and is attached thereto by means of stitches 40, as best seen in FIG. 3. Backing member 36 is preferably comprised of a relatively rigid plastic material.

A plurality of transparent, plastic storage bags 42 are preferably arranged in discrete groups of five individual bags by means of a corresponding loop fastener 44. Loop fasteners 44 are preferably comprised of a plurality of loop-like elements of a flexible material, sold under the trademark "VELCRO" by Velcro Corporation of New York, N.Y. Loop fasteners 44 are used to attach bags 42 to backing member 36, as will be described in greater detail hereinafter.

In the preferred embodiment, each bag 42 is substantially square-shaped with length and width dimensions of approximately 4 inches by 4 inches and a thickness of approximately 0.004 inch. Each bag 42 is preferably of the self-sealing type, having male and female rib members on opposed panels of the corresponding bag 42, adjacent to the mouth end thereof. When the ribs are in mating engagement, the mouth end is substantially closed off along an axis 46, which leaves adjacent ends of the opposed panels free to facilitate reopening of the bag after closure.

Each bag 42 preferably contains one spinner bait 34 or other individual fishing lure. The spinner baits 34 can be divided in a number of ways, such as by the shape or color of the spinner blade or by the number of blades. The spinner baits 34 of a particular type are preferably stored in the same group of bags 42 to help the fisherman find the particular bait he is looking for.

The individual bags 42 of each group are secured together at respective end portions thereof, opposite from the respective mouth ends of the corresponding bags, by means of loop fasteners 44. A loop fastener 44 is wrapped the respective end portions of the individual bags 42 of each group and is secured thereto by stitching, such that the individual bags 42 of each group are maintained substantially in registration with one another. The corresponding group of bags is attached to the backing member 36 by the engagement between hook and loop fasteners 38 and 44. Each group of bags is attached to backing member 36 at a discrete position thereon, such that the bags are in staggered, overlapping relation, with all but the lowermost group of bags partially overlapping the groups below. For example the top group of bags will normally be attached to backing member 36 first, followed by the next underlying group and so on until all of the groups have been attached thereto. Ten different groups of bags 42 are shown in FIGS. 2 and 3.

A flexible strap 48 is attached to a top portion of hook fastener 38 for hanging device 32 in a vertical orientation. When bags 42 are attached to backing member 36, as described above, bags 42 define respective flaps with the respective mouth ends of the bags being free, thereby allowing the fisherman to "flip through" the bags to find the desired spinner bait 34. The partially overlapping relationship of the groups of bags 42 allows the respective mouth ends of the bags 42 to extend slightly beyond the respective mouth ends of the bags 42 of the group just above it, so that the fisherman can immediately grasp the mouth ends of each group of bags 42. Each group of bags 42 can be identified by a protruding tab or other label (not shown) to further assist the fisherman in finding the desired lure.

Device 32 provides an effective, easy to use spinner bait "file", in much the same manner that a card index or card file allows one to look up specific information on the cards. In addition to providing ready access to the fishing lures, device 32 separates the individual lures to prevent entangling thereof.

Referring to FIG. 4, an article 50 is provided for storing and organizing substantially cylindrical containers 52, which are used to store natural bait, such as pork rinds and the like. Article 50 is preferably comprised of a piece of die-cut foam rubber material, having a thickness between its major surfaces of approximately 1½ inches. Device 50 has a substantially rectangular shape and includes a plurality of substantially circular openings 54 in a top surface 56 thereof. Openings 54 extend into article 50 from top surface 56 to provide respective recessed regions for receiving cylindrical containers 52. One such container 52 is shown in FIG. 4. The depth of each recessed region is sufficient to maintain the corresponding container 52 in a substantially stable position therein and the flexible foam material effectively cushions containers 52 to prevent contact therebetween, which can cause breakage. A bottom surface 58 is disposed beneath each recessed region for journally supporting the bottom of the corresponding container 52.

Article 50 can be used in conjunction with device 32 when device 32 is used to store jig heads or the like. It is a favorite technique to hook a piece of pork rind on a jig lure to attract fish. The pork rinds can be stored in containers 52 and the jig heads can be stored in the individual bags 42 of device 32.

Referring again to FIG. 1, article 50 is typically stored in casing 12 by positioning it horizontally in the bottom portion 14 of casing 12, with containers 52 positioned in the corresponding recessed regions. Device 32 is also positioned horizontally within casing 12, on top of article 50, such that backing member 36 lies flush against the respective tops of containers 52. The individual groups of bags will lie in stacked, partially overlapping relation on top of backing member 36.

Referring to FIGS. 5 and 6, an alternate embodiment of a device for storing and organizing fishing lures is depicted. Device 60 is substantially the same as device 32, described above with reference to FIGS. 2 and 3, except that the individual bags 62 of device 60 have a greater width than bags 42. In the preferred embodiment, each bag 62 has length and width dimensions of approximately 4 by 8 inches and a thickness of approximately 0.004 inch. Device 60 includes a relatively rigid, plastic backing member 64 with a hook fastener 66 disposed on a major surface thereof. Hook fastener 66 is attached to backing member 64 by stitching 68, as shown in FIG. 6.

A complementary loop fastener 70 secures the respective end portions of the individual bags 62 of each group together, in substantially the same manner as in device 32, described above with reference to FIGS. 2 and 3. Five discrete groups of bags 62 are shown in FIG. 5 and the individual groups are coupled to backing member 64 by means of hook and loop fasteners 66 and 70 at respective discrete positions along the minor dimension of backing member 64.

Storage bags 62 are used for storing larger fishing lures, such as plastic worms 72 or worm crawlers. Other than as stated above, bags 62 are substantially the same as bags 42, previously described with reference to FIGS. 2 and 3.

Various embodiments of the invention have now been described in detail. Since it is obvious that many changes in and additions to the above-described preferred embodiment may be made without departing from the nature, spirit and scope of the invention, the invention is not to be limited to said details, except as set forth in the appended claims.

What is claimed is:

1. A device for storing fishing accessories, comprising:
    a backing member having a first attachment member on a surface thereof; and
    a plurality of storage bags arranged in discrete groups, each bag having a closeable mouth at a first end thereof through which fishing accessories are removable from and insertable into the bag, each group having a second attachment member for securing the individual bags of each group together at respective second ends of the bags, opposite from the respective first ends thereof, the second attachment members being complementary with said first attachment member for removably attaching the respective groups of bags to the backing member at the respective second ends of the bags, the first end of each bag being a free end.

2. The device of claim 1 wherein each bag has means for sealing the mouth thereof.

3. The device of claim 1 wherein said first attachment member is comprised of a hook fastener and said second attachment members are each comprised of a complementary loop fastener.

4. The device of claim 1 further including a strap member secured to said backing member for hanging said device in a vertical orientation.

5. The device of claim 1 wherein said backing member is relatively flat and said first attachment member is located on a major surface of said backing member, each group of bags being removably attached to said first attachment member, such that the individual bags of each group are substantially in registration and the groups are in overlapping relation, all but the lowermost group being in partially overlapping relation with the groups below.

6. A device for storing and transporting fishing accessories, comprising:
    means for storing the fishing accessories, including:
        a backing member having a first attachment member on a surface thereof;
        a plurality of storage bags arranged in discrete groups, each bag having a closeable mouth at a first end thereof through which fishing accessories are removable from and insertable into the bag, each group having a second attachment member for securing the individual bags of each group together at respective second ends of the bags, opposite from the first ends thereof, the second attachment members being complementary with said first attachment member for removably attaching the respective groups of bags to the backing member at the respective second ends of the bags, the respective first end of each bag being a free end; and
    a flexible casing for retaining the fishing accessory storage means in a substantially flat position within the casing.

7. The device of claim 6 wherein said casing includes a handle to facilitate transport of said fishing accessory storage means.

8. The device of claim 7 wherein said casing is comprised of a bottom portion and first and second portions depending from said bottom portion, said first and second portions being connected by a zipper member, whereby said casing can be opened and closed by means of said zipper member.

9. The device of claim 6 further including an article for storing and organizing fishing bait containers, comprised of a flexible retaining member having a plurality of recessed regions therein for receiving respective containers, the depth of each recessed region being sufficient to hold the corresponding container in a substantially stable position, said retaining member for being positioned beneath said lure organizing means in said casing.

10. The device of claim 9 wherein the retaining member is substantially rectangular and has a substantially solid bottom surface to support the respective bottoms of the containers stored therein, a top surface of said retaining member having a plurality of openings therein communicating with the respective recessed regions.

11. The article of claim 10 wherein said openings and said recessed regions are adapted for receiving substantially cylindrical containers.

12. The device of claim 6 wherein said first attachment member is comprised of a hook fastener and said second attachment members are each comprised of a complementary loop fastener.

13. The device of claim 6 wherein said lure organizing means includes a strap member secured to said backing member for hanging said lure organizing means in a vertical orientation.

14. The device of claim 6 wherein said backing member is relatively flat and said first attachment member is located on a major surface of said backing member, each group of bags being removably attached to said first attachment member, such that the individual bags of each group are substantially in registration and the groups are in overlapping relation, all but the lowermost group being in partially overlapping relation with the groups below.

15. A device for storing fishing accessories, comprising:

a backing member having a first attachment member on a surface thereof; and a plurality of storage bags arranged in discrete groups, each bag having a closeable mouth at a first end thereof through which fishing accessories are removable from and insertable into the bag, each group having a second attachment member for securing respective second ends of the bags of each group together, the respective second ends of the bags being opposite from the respective first ends thereof, the second attachment members being complementary with the first attachment member for removably attaching the respective groups of bags to the backing member at the respective second ends of the bags, the first end of each bag being a free end, such that each bag defines a separate enclosure which is accessible through the mouth of the bag at the first end thereof.

16. The device of claim 15 wherein each of said bags is comprised of first and second substantially rectangular flexible panels in facing relation and joined along respective three sides thereof to define the enclosure and the open mouth at the first end thereof.

17. The device of claim 15 wherein each of the second attachment members overlaps the respective second ends of the individual bags of each group along substantially the entire length of the respective second ends.

* * * * *